United States Patent [19]

Sawada et al.

[11] Patent Number: 5,772,746
[45] Date of Patent: Jun. 30, 1998

[54] INK JET RECORDING LIQUID

[75] Inventors: Seiji Sawada; Sunao Satake; Yasuharu Iida; Seiji Aida; Yoshimitsu Ueno, all of Tokyo, Japan

[73] Assignee: Toyo Ink Manufacturing Co., Ltd., Tokyo, Japan

[21] Appl. No.: 825,569

[22] Filed: Mar. 31, 1997

[30] Foreign Application Priority Data

Apr. 1, 1996 [JP] Japan ................................ 8-078502

[51] Int. Cl.$^6$ ........................................... C09D 11/02
[52] U.S. Cl. .................................. 106/31.86; 106/31.89; 106/31.67; 106/31.6
[58] Field of Search ................... 106/31.6, 31.86, 106/31.89, 31.67, 31.69

[56] References Cited

U.S. PATENT DOCUMENTS

| 5,141,556 | 8/1992 | Matrick | 106/31.58 |
| 5,286,027 | 2/1994 | Chan et al. | 106/31.86 |
| 5,356,464 | 10/1994 | Hickman et al. | 106/31.86 |
| 5,389,132 | 2/1995 | Davulcu et al. | 106/31.86 |
| 5,656,071 | 8/1997 | Kappele et al. | 106/31.76 |
| 5,658,376 | 8/1997 | Noguchi et al. | 106/31.59 |

*Primary Examiner*—Helene Klemanski
*Attorney, Agent, or Firm*—Oblon, Spivak, McClelland, Maier & Neustadt, P.C.

[57] ABSTRACT

The present invention relates to an ink jet recording liquid obtained by dispersing a pigment in an aqueous medium, said aqueous medium comprising glycerol and 1,3-propanediol. The ink jet recording liquid of the present invention is capable of sustaining prolonged stable discharge onto the recording surface without clogging the nozzle of an ink jet printer and exhibits excellent storage stability.

10 Claims, No Drawings

INK JET RECORDING LIQUID

BACKGROUND OF THE INVENTION

1. Field of the Invention

The present invention relates to an ink jet recording liquid. More specifically, this invention relates to an ink jet recording liquid containing pigment, which does not clogs extremely narrow opening(discharge orifice) and has good discharge stability and storage stability.

2. Description of the Prior Art

Various aqueous ink jet recording liquids have been in use which are prepared by dissolving water-soluble dyes in aqueous media and adding variety of additives as needed to the resulting solutions. Important properties required for such an aqueous ink jet recording liquid are as follows:

(1) ability to produce high-quality printed images free from bleeding, (2) rapid drying and fixing rate of the recording liquid, (3) the recording liquid can be discharged stably without causing clogging of the recording liquid at a nozzle and liquid flow passages, (4) a superior storage stability of the recording liquid, (5) a high recording density, and (6) a superior weather-and water-resistance of the printed matter.

Clogging of the recording liquid at the nozzle is one of the serious problems affecting the reliability of an ink jet recording method. There are three possible causes for clogging:

(1) Drying-out and solidification of the recording liquid in the nozzle.

(2) An increase in viscosity of the recording liquid in the nozzle.

(3) Coagulation or precipitation of the recording liquid in the nozzle.

In the prior art practice, wetting agents have been added to the recording liquid to avoid the clogging of the nozzle. Preferred wetting agents have been those which are highly soluble in water, capable of absorbing water and exhibit high solubility. Such wetting agents used in the prior art include aliphatic polyhydric alcohols such as ethylene glycol and diethylene glycol, alkyl ether derivatives of aliphatic polyhydric alcohols, and acetates of aliphatic polyhydric alcohols as disclosed in Japanese Patent Application Laid-open No. S56-57862 and No. S56-76475. However, if a sufficient quantitiy of wetting agent is added to the recording liquid to prevent clogging, the viscosity of the recording liquid significantly increases and its temperature dependence increases. As a consequence, one is confronted with a loss of discharge stability of the recording liquid.

Also, Japanese Patent Application Laid-open No. S57-57761 discloses a dye-type recording liquid, in which a mixture of glycerol and other polyhydric alcohol or an alkyl ether of polyhydric alcohol is used as a wetting agent.

On the other hand, when a pigment is used as a coloring agent, compatibility of a dispersant with the wetting agent significantly affects the storage stability of a recording liquid. The storage stability is sometimes impaired appreciably by the choice of wetting agent. The recording liquid using the pigment as the coloring agent thus presents new problems that have not been encountered in conventional dye-type recording liquids. In particular, it has been considerably difficult so far to prepare an aqueous recording liquid of a pigment-dispersion type which simultaneously fulfills the requirements of discharge stability, high water retentivity, and storage stability.

SUMMARY OF THE INVENTION

The object of the present invention concerning an ink jet printer is to provide an aqueous ink jet recording liquid containing pigment, which does not clog at a minute discharge orifice (nozzle) installed in a printer head and has superior discharge stability and storage stability.

The ink jet recording liquid of the present invention does not clog the discharge nozzle of a printer head. It can thus sustain prolonged stable discharge to the recording surface and offer outstanding storage stability. The ink jet recording liquid of the present invention, therefore, can be used effectively in an office for document preparation, addressing envelopes, marking corrugated cardboards, numbering, printing bar codes and other tasks. The recording liquid of the present invention is superior to dye-type recording liquids in light fastness and in its ability to produce documents having superior storage stability.

To accomplish the object of the present invention described above, the inventors of the present invention have investigated various wetting agents to be incorporated into an aqueous ink jet recording liquid of a pigment-dispersion type. As a result, the inventors have selected, a binary system consisting of glycerol and 1,3-propanediol as a wetting agent.

Accordingly, the present invention is characterized as an ink jet recording liquid in which a pigment is dispersed in an aqueous medium, said aqueous medium comprising glycerol and 1,3-propanediol.

When glycerol is added to a recording liquid, the recording liquid acquires sufficient water retentivity. However, glycerol, when used by itself, tends to increase the viscosity of the recording liquid. Addition of 1,3-propanediol to the recording liquid containing glycerol helps to maintain low viscosity of the liquid, suppresses increase in viscosity as water evaporates and provides sufficient water retentivity. The recording liquid thus prepared does not become excessively viscous nor does it dry out and solidify in a nozzle. Furthermore, the wetting agent composed of the binary system described above is highly compatible with a dispersant and does not affect the dispersability of the recording liquid. Accordingly, the present invention provides an ink jet recording liquid of a pigment type which discharges stably without clogging the nozzle and has superior storage stability.

DESCRIPTION OF THE PREFERRED EMBODIMENT

The aqueous medium of the ink jet recording liquid of the present invention comprises water, glycerol, 1,3-propanediol, and other aqueous solvent which may be added as required.

For water, ion exchange water free from a metal ion and other impurities, distilled water, or the like can be used.

The ratio by weight of glycerol to 1,3-propanediol is preferably in a range from 1:10 to 10:1. If the amount of glycerol to be added is less than the above ratio, the recording liquid tends to dry out or solidify in the nozzle. If the amount of glycerol is more than the above ratio, the recording liquid tends to become viscous, resulting in a clogged nozzle.

The ratio of the total amount of glycerol and 1,3-propanediol to the total amount of the recording liquid is preferably in a range from 3 to 50 wt%. If the total amount of glycerol and 1, 3-propanediol exceeds 50 wt%, the viscosity of the recording liquid increases resulting in the likelihood of reduced discharge stability. On the other hand, if the total amount of glycerol and 1,3-propanediol is lower than 3 wt%, the recording liquid tends to dry out or solidify in the nozzle.

Alcohols such as methanol, ethanol, isopropyl alcohol may also be added in the range from 2 to 50 wt. % in the recording liquid to promote drying of the recording liquid on recording paper.

For pigment, one can use various pigments used for printing ink, paint, etc. The Color Index (C.I.) numbers of such pigments are as follows: C.I. Pigment Yellow 20, 24, 86, 93, 109, 110, 117, 125, 137, 138, 147, 148, 153, 154, 166 and 168; C.I. Pigment Orange 36, 43, 51, 55, 59 and 61; C. I. Pigment Red 9, 97, 122, 123, 149, 168, 177, 180, 192, 215, 216, 217, 220, 223, 224, 226, 227, 228 and 240; C.I. Pigment Violet 19, 23, 29, 30, 37, 40 and 50; C.I. Pigment Blue 15, 15:1, 15:4, 15:6, 22, 60 and 64; C.I. Pigment Green 7 and 36; C.I. Pigment Brown 23, 25 and 26; C.I. Pigment Black 7 and titanium black.

The pigments listed above may be used in the form of an aqueous slurry after the formation of the pigment or may be used in the powdered form obtained by drying the slurry, by spray drying or by allied methods. It is also possible to use surface-treated pigments having a functionalized surface.

The smaller the size of the pigment particles, the better the splash property of the recording liquid. It is thus preferable to use pigment particles having a smaller particle size or to use a pigment which can be finely divided during the dispersion step. The pigment particles have preferably an average particle size not larger than 0.2 $\mu$m, more preferably not larger than 0.1 $\mu$m, as measured by centrifugal sedimentation. The use of a pigment of such small particle size facilitates filtering operation during the preparation of the recording liquid and reduces the precipitation as it ages.

For the ink jet recording liquid of the present invention, a dye can be used in combination to adjust the hue or impart the recording density as long as it is not used excessively resulting in poor water resistance or light resistance. The use of the dye sometimes deteriorates the dispersion stability of the pigment. Accordingly, it is necessary to limit the proportion of the dye to no more than 40 wt. %, preferably no more than 25 wt. % of the pigment. Examples of the dye that can be utilized in the present invention include acid dyes, basic dyes, direct dyes, reactive dyes, disperse dyes and metal-containing dyes. Preferred are purified dyes from which inorganic salts has been removed.

Exemples of dyes include C.I. Direct Black 17, 19, 32, 51, 71, 108, 146, 154 and 166; C.I. Acid Black 2, 7, 24, 26, 31, 52, 63, 112 and 118; C.I. Basic Black 2; C.I. Direct Blue 6, 22, 25, 71, 90 and 106; C.I. Acid Blue 9,22, 40, 59, 93, 102, 104, 113, 117, 120, 167, 229 and 234; C.I. Basic Blue 1, 3, 5, 7, 9, 24, 25, 26, 28 and 29; C.I. Direct Red 1, 4, 17, 28 and 83; C.I. Acid Red 1, 6, 32, 37, 51, 52, 80, 85, 87, 92, 94, 115, 180, 256, 315 and 317; C.I. Basic Red 1, 2, 9, 12, 13, 14 and 37; C.I. Direct Yellow 12, 24, 26 and 98; C.I. Acid Yellow 11, 17, 23, 25, 29, 42, 61 and 71; C.I. Basic Yellow 11 and 28; C.I. Direct Orange 34, 39, 44, 46 and 60; C.I. Direct Violet 47 and 48; C.I. Direct Brown 109; C.I. Direct Green 59; C.I. Acid Orange 7 and 19; C.I. Acid Violet 49; C.I. Basic Violet 7, 14 and 27.

It is preferable to add a resin-type dispersant, surfactant, or the like to the ink jet recording liquid as a dispersant to improve the dispersibility of a pigment.

For resin-type dispersants, aqueous acrylic resins, styrene-acryl copolymeric resins, polyester resins, polyamide resins, polyurethane resins, fluororesins, or the like can be used.

As surfactants, anionic surfactants, nonionic surfactants, cationic surfactants, or ampholytic surfactants can be used.

Examples of anionic surfactants include fatty acid salts, alkylsulfate ester salts, alkylarylsulfonate salts, alkylnaphthalenesulfonate salts, dialkylsulfonate salts, dialkylsulfosuccinate salts, alkyldiaryl ether disulfonate salts, alkylphosphate salts, polyoxyethylene alkylether sulfate salts, polyoxyethylene alkylaryl ether sulfate salts, naphthalenesulfonic acid formalin condensate, polyoxyethylene alkylphosphate ester salts, glycerol borate fatty acid esters and polyoxyethylene glycerol fatty acid esters.

Examples of nonionic surfactant include polyoxyethylene alkyl ethers, polyoxyethylene alkylaryl ethers, polyoxyethylene oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters and polyoxyethylene alkylamines as well as fluorochemical and silicon group nonionic surfactants.

Examples of cationic surfactant include alkylamine salts, quaternary ammonium salts, alkyl pyridinium salts and alkyl imidazolium salts.

Examples of amphoteric surfactant include alkylbetaine, alkylamine oxide and phosphatidyl choline.

In the ink jet recording liquid of the present invention, it is preferable to use an aqueous or water-dispersible resin as a vehicle resin in an amount from 0.1 to 15 wt. % as a resin solid in the recording liquid. If the fraction of the vehicle resin is less than 0.1 wt. %, the fixing capability of the recording liquid onto a recording medium diminishes. On the other hand, if an amount in excess of 15 wt. % is used, the storage stability suffers and it is liable to cause clogging.

Examples of the aqueous resin are polyvinyl alcohol, polyvinyl pyrrolidone, polyacrylamide, carboxyl-containing aqueous polyester, hydroxyl-containing cellulose resin, and acrylic resin. Examples of the water-dispersible resin are an acrylic resin, vinyl acetate resin, butadiene resin, urethane resin, polyester resin, or petroleum resin. Preferable water-dispersible resins are those with a particle diameter of less than 0.4 $\mu$m, more preferably less than 0.1 $\mu$m. If the particle diameter of the resin is larger, the recording liquid is liable to cause clogging.

Moreover, various additives as described below can be added as needed to the ink jet recording liquid of the present invention:

If a recording sheet is water-permeable, as is the case with paper, it is possible to add a penetrant to accelerate the penetration of the recording liquid into paper, thereby improving the apparent drying rate.

Examples of the penetrant include glycol ethers such as diethylene glycol monobutyl ether, alkylene glycol, polyethylene glycol monolauryl ether, sodium laurylsulfate, sodium dodecylbenzenesulfonate, sodium oleate and sodium dioctylsulfosuccinate. The penetrant brings about desired effect when used in an amount no more than 5 wt. % of the recording liquid. When one uses an amount in excess of 5 wt. % of the recording liquid, undesirable bleeding of printed images and print-through would result.

A mildewproofing agent serves to prevent the growth of mildew in the recording liquid. Examples of the mildewproofing agent include sodium dehydroacetate, sodium benzoate and sodium pyridinethion-1-oxide, zincpyridinethion-1-oxide, and amine salts of 1,2-benzisothiazolin-3-one or 1-benzisothiazolin-3-one. The mildewproofing agent is used in an amount ranging from 0.05 wt. % to 1.0 wt. % of the recording liquid.

The chelating agent serves to block metal ions in the recording liquid and prevent the precipitation of metals in the nozzle and of insoluble matters in the recording liquid. Examples of the chelating agent include ethylene diamine tetraacetic acid, sodium salt of ethylenediamine tetraacetic acid, diammonium salt of ethylene diamine tetraacetic acid and tetraammonium salt of ethylene diamine tetraacetic acid. The chelating agent is used in an amount ranging from 0.005 wt. % to 0.5 wt. % of the recording liquid.

In addition, a pH regulator such as amine, inorganic salts and ammonia, or a buffer such as phosphoric acid can be added to regulate the pH of the recording liquid, obtain its dispersion stability and protect the tubing of the liquid passage of the ink jet printer.

Moreover, in order to inhibit foam generation during circulation and transfer of the recording liquid or during the preparing of the recording liquid, anti-foaming agent can be added.

As another additive, urea, dimethyl urea or the like can also be added.

The ink jet recording liquid of the present invention can be prepared by the following processes. First, a pigment, water, glycerol, 1,3-propanediol, and, as required, dispersant, aqueous or water-dispersible vehicle resin, and aqueous solvent are mixed. The mixture is then dispersed using a dispersing machine such as a sand mill, homogenizer, ball mill, paint shaker, or ultrasonic dispersing machine to produce the ink jet recording liquid.

Alternatively, an aqueous dispersion of pigment is first produced by dispersing a pigment in an aqueous medium, adding a dispersant as required. An aqueous or water-dispersible vehicle resin, other solvent, or the like are added to the aqueous dispersion of pigment thus obtained to prepare the ink jet recording liquid of the present invention. Glycerol and 1,3-propanediol may also be added to the aqueous medium when the aqueous dispersion is being prepared, or it may be added to the aqueous dispersion after the acqueous dispersion of pigment is prepared.

The ink jet recording liquid can also be obtained by first preparing a well-kneaded mixture of a pigment, dispersant, and aqueous or water-dispersible resin using a kneader and a twin roll mill, dispersing the mixture further using the sand mill described above or the like, diluting the mixture by appropriate addition of water, and then blending glycerol, 1,3-propanediol, and other optional additives to the resulting mixture.

The mixing and stirring can be accomplished by a stirrer with blades, high speed dispersing machine, or emulsifier, or the like.

It is preferred that the recording liquid is filtered thoroughly prior to or after dilution through a filter having a pore size of 0.65 μm or less, more preferably through a filter having a pore size of 0.45 μm or less. Prior to the filtration process through a filter, filtration by centrifugal separator can be added to reduce filter clogging to cut down the frequency of filter exchange. Viscosity of the prepared recording liquid should be adjusted to fall in the range of 0.8 cps to 15 cps (25° C.), depending on the design of the ink jet printer. The surface tension should be 25 to 60 dyne/cm.

No particular limitation is imposed on the pH but the pH within a range of 4 to 12 is preferred, and weak alkaline range of 7 to 9 pH is particularly preferred.

EXAMPLES

The present invention will hereinafter be described more specifically based on examples. It should, however, be noted that the scope of the present invention is not limited to or by these specific examples, in which all designations of parts and percentages(%) indicate parts by weight and weight percentages(wt.%),respectively.

Preparations 1–7:

15 parts by weight of a cyan pigment ("LIONOL BLUE 7351", TOYO INK MFG. CO., LTD.), 10 parts by weight of an acrylic resin-type dispersant ("PDX-6101", JOHNSON POLYMER Co., Ltd.: 30% solid), and 75 wt. % of purified water were dispersed for two hours using a sand mill to prepare an aqueous dispersion of pigment. The prepared aqueous dispersion of pigment thus prepared was combined with the components listed below to be agitated and mixed with a dispersing machine. The resulting mixture was then filtered using a membrane filter of nitrocellulose resin with a pore size of 0.45 μm to obtain the blue recording liquid of Preparation 1.

Dispersion of pigment: 20 parts
Glycerol: 10 parts
1,3-propanediol: 5 parts
Acrylic resin emulsion ("F-157", NIPPON 2.3 parts
POLYMER Co., Ltd.: 40% solid)
Water: 62.7 parts The recording liquids of Preparations 2–7 were prepared in the same manner as in Preparation 1 except that the amounts of glycerol and 1,3-propanediol were varied. Components used for these preparationes are shown in Table 1.

Preparations C1–C6 (C stands for Comparison):

The blue recording liquids of Preparation C1 and C2 were prepared by using the aqueous dispersion of pigment obtained as a step in the production of Preparations 1 and 2, respectively, following the identical procedures as described above except that the additive was limited to either glycerol or 1,3-propanediol and not both. Components used for these Preparations C1–C2 are shown in Table 1.

The recording liquids of Preparations C3–C6 were prepared in the same manner as in the Preparations 1–7 except that glycol was added in place of 1,3-parpanediol. Components used for these Preparations C3–C6 are shown in Table 1.

The clogging resistance, discharge stability, and storage stability of each of the recording liquids Preparations 1–7 and Preparations C1–C6 were evaluated. This was accomplished by filling the cartridge of an ink jet printer ("HG-5130" manufactured by Seiko Epson Co., Ltd.) with the test Preparations and then printing. The results of this evaluation are shown in Table 1.

1) Clogging resistance

The clogging resistance was evaluated by printing one hour after a cap was removed from the printer head. Out of the total of 48 nozzles, those clogged were counted. The clogging resistance of the recording liquid was rated according to a number of clogged nozzles. In Table 1, the symbol "⊙" indicates that none of nozzles was clogged, the symbol "Δ" indicates that 1–24 nozzles were clogged, and the symbol "X" indicates that 24–48 nozzles were clogged.

2) Discharge stability

The discharge stability was evaluated after continuous printing for 10 minutes. Out of the total of 48 nozzles, those clogged were counted. The discharge stability of the recording liquid was rated according to a number of clogged nozzles. In Table 1, the symbol "⊙" indicates that none of nozzles was clogged, the symbol "Δ" indicates that 1–24 nozzles were clogged, and the symbol "X" indicates that 24–48 nozzles were clogged.

3) Storage stability

The storage stability was evaluated by storing the recording liquid at 60° C. for three months, after which changes in the particle diameter and viscosity were measured. The storage stability was rated according to the changes in the particle diameter and viscosity. In Table 1, the symbol "⊚" indicates that neither the particle diameter nor the viscosity changed, the symbol "Δ" indicates that only the particle diameter changed, and the symbol "X" indicates that both the particle diameter and the viscosity changed.

In Table 1, dispersant "A" represents an aqueous solution of an acrylic resin-type high polymer dispersant ("PDX-6101", JOHNSON POLYMER Co., Ltd.), dispersant "B" a dispersant of an anionic surfactant ("Newcol 565 SNC", NIPPON NYUKAZAI Co., Ltd.: 100% solid), and dispersant "C" an aqueous solution of an anionic surfactant ("Newcol 707 SN", NIPPON NYUKAZAI Co., Ltd.: 30% solid).

Vehicle resin emulsion "A" represents an emulsion of acrylic resin ("F-157", NIPPON POLYMER Co., Ltd.: 40% solid) and vehicle resin emulsion "B" an emulsion of an acrylic resin ("JOHNCRYL 450", JOHNSON POLYMER Co., Ltd.: 42% solid).

Glycol "A" represents ethylene glycol, glycol "B" diethylene glycol, glycol "C" 1,3-butanediol, and glycol "D" propylene glycol (1,2-propanediol).

TABLE 1

| | | Preparation 1–7 | | | | | | | Preparation C1–C6 | | | | | |
|---|---|---|---|---|---|---|---|---|---|---|---|---|---|---|
| | | 1 | 2 | 3 | 4 | 5 | 6 | 7 | C1 | C2 | C3 | C4 | C5 | C6 |
| Dispersion of pigment | Pigment (C.I.) (part) | Blue 15:3 (15) | Blue 15:3 (15) | Blue 15:3 (15) | Blue 15:3 (15) | Blue 15:3 (15) | Red 122 (15) | Black 7 (15) | Blue 15:3 (15) | Blue 15:3 (15) | Blue 15:3 (15) | Blue 15:3 (15) | Blue 15:3 (15) | Red 122 (15) |
| | Dispersant (part) | A (10) | A (10) | A (10) | A (10) | A (10) | B (2) | C (10) | A (10) | A (10) | A (10) | A (10) | A (10) | B (10) |
| | Purified water (part) | 75 | 75 | 75 | 75 | 75 | 83 | 75 | 75 | 75 | 75 | 75 | 75 | 75 |
| | Average particle size | 100 nm | 100 nm | 100 nm | 100 nm | 100 nm | 80 nm | 60 nm | 100 nm | 100 nm | 100 nm | 100 nm | 100 nm | 80 nm |
| Recording liquid | Dispersion of pigment (part) | 20 | 20 | 20 | 20 | 20 | 20 | 20 | 20 | 20 | 20 | 20 | 20 | 20 |
| | Vehicle resin emulsion (part) | A (2.3) | A (2.3) | A (2.3) | A (2.3) | A (2.3) | B (0.5) | B (1.0) | A (2.3) | A (2.3) | A (2.3) | A (2.3) | A (2.3) | B (0.5) |
| | Glycerol (part) | 10 | 5 | 40 | 0.1 | 5 | 5 | 5 | 15 | / | 10 | 10 | 10 | 10 |
| | 1,3-propanediol (part) | 5 | 10 | 20 | 0.5 | 0.1 | 10 | 10 | / | 15 | / | / | / | / |
| | Glycol (part) | / | / | / | / | / | / | / | / | / | A (5) | B (5) | C (5) | D (5) |
| | Purified water (part) | 62.7 | 62.7 | 17.7 | 77.1 | 72.6 | 64.5 | 64.0 | 62.7 | 62.7 | 62.7 | 62.7 | 62.7 | 62.7 |
| Results of Evaluation | Clogging resistance | ⊚ | ⊚ | ⊚ | Δ | Δ | ⊚ | ⊚ | X | X | X | X | X | X |
| | Discharge stability | ⊚ | ⊚ | Δ | ⊚ | ⊚ | ⊚ | ⊚ | ⊚ | ⊚ | ⊚ | ⊚ | ⊚ | ⊚ |
| | Storage stability | ⊚ | ⊚ | ⊚ | ⊚ | ⊚ | ⊚ | ⊚ | ⊚ | ⊚ | X | X | X | X |

What is claimed is:

1. An ink jet recording liquid containing a pigment dispersed in an aqueous medium, said aqueous medium comprising glycerol and 1,3-propanediol; and
an aqueous or water-dispersible vehicle resin in a ratio by weight from 0.1 to 15% as a resin solid to the total amount of the ink jet recording liquid.

2. The ink jet recording liquid according to claim 1, further comprising a dispersant.

3. The ink jet recording liquid according to claim 2, wherein said dispersant is a resin dispersant comprising a resin selected from a group consisting of an aqueous acrylic resin, styrene-acryl copolymeric resin, polyester resin, polyamide resin, polyurethane, fluororesin, and mixtures thereof.

4. The ink jet recording liquid according to claim 3, wherein said resin dispersant comprises an acrylic resin.

5. The ink jet recording liquid according to claim 2, wherein said dispersant is an anionic surfactant.

6. The ink jet recording liquid according to claim 5, wherein said anionic surfactant is selected from a group consisting of fatty acid salts, alkylsulfonate ester salts, alkylarylsulfonate salts, alkylnaphthalenesulfonate salts, dialkylsulfonate salts, dialkylsulfosuccinate salts, alkyldiaryl ether disulfonate salts, alkylphosphate salts, polyoxyethylene alkyl ether sulfonate salts, polyoxyethylene alkylaryl ether sulfonate salts, naphthalene sulfonic acid formalin condensate, polyoxyethylene alkylphosphate ester salts, glycerol borate fatty acid esters, polyoxyethylene glycerol fatty acid esters, and mixtures thereof.

7. The ink jet recording liquid according to claim 1, wherein the ratio by weight of said glycerol to said 1,3-propanediol is in a range from 1:10 to 10:1.

8. The ink jet recording liquid according to claim 1, wherein the ratio by weight of the total amount of said glycerol and said 1,3-propanediol to the total amount of the ink jet recording liquid is in a range from 3 to 50%.

9. The ink jet recording liquid according to claim 1, wherein said vehicle resin is one of the compound selected from a group consisting of polyvinyl alcohol, polyvinyl pyrrolidone, polyacrylamide, carboxyl-containing aqueous polyester, hydroxyl-containing cellulose resin, acrylic resin, and mixtures thereof.

10. The ink jet recording liquid according to claim 1, wherein said water-dispersible vehicle resin has a particle diameter of less than 0.4 μm and is one of the compound selected from a group consisting of an acrylic resin, vinyl acetate resin, butadiene resin, urethane resin, polyester resin, petroleum resin, and mixtures thereof.

* * * * *